United States Patent
Walliser et al.

(10) Patent No.: US 11,139,656 B2
(45) Date of Patent: Oct. 5, 2021

(54) POWER SUPPLY ARRANGEMENT

(71) Applicant: DET International Holding Limited, George Town (KY)

(72) Inventors: Dietmar Walliser, Emmendingen (DE); Michael Mentele, Teningen (DE); Jurgen Schweizer, Endingen (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 190 days.

(21) Appl. No.: 15/462,389

(22) Filed: Mar. 17, 2017

(65) Prior Publication Data
US 2017/0302081 A1     Oct. 19, 2017

(30) Foreign Application Priority Data

Apr. 14, 2016  (EP) .................................... 16165380

(51) Int. Cl.
*H02J 3/38*        (2006.01)
*H02M 7/44*       (2006.01)

(52) U.S. Cl.
CPC .............. *H02J 3/382* (2013.01); *H02J 3/381* (2013.01); *H02J 3/383* (2013.01); *H02J 3/386* (2013.01);
(Continued)

(58) Field of Classification Search
CPC .. H02J 3/381; H02J 3/382; H02J 3/383; H02J 3/386; H02J 2003/388; H02J 3/388;
(Continued)

(56) References Cited

U.S. PATENT DOCUMENTS

2002/0109410 A1*  8/2002  Young ..................... H02J 9/062
                                                                      307/64
2004/0124710 A1   7/2004  Pfeiffer
(Continued)

FOREIGN PATENT DOCUMENTS

EP    1592106    11/2005
EP    1965483     9/2008
(Continued)

OTHER PUBLICATIONS

European Search Report for EP application No. 16165380.3, dated Sep. 20, 2016.
(Continued)

*Primary Examiner* — Toan T Vu
(74) *Attorney, Agent, or Firm* — Vector IP Law Group LLC; Robert S. Babayi (57) ABSTRACT

The present application relates to a power supply arrangement comprising a power source and a switching arrangement. The switching arrangement includes a switching block, wherein the switching block includes a source interface for connecting the power source, a load interface for connecting a load and a grid interface for connecting a power grid. The switching arrangement includes further a controller for controlling the switching block in dependency of the condition of the power source. The switching arrangement is implemented as a unit separate from the power source. The power supply arrangement comprises further a monitoring device for monitoring the condition of the power source.

13 Claims, 6 Drawing Sheets

(52) U.S. Cl.
CPC ............... *H02M 7/44* (2013.01); *H02J 3/388* (2020.01); *Y02E 10/56* (2013.01)

(58) Field of Classification Search
CPC ..... H02J 2300/24; H02M 7/44; Y02E 10/563; Y02E 10/56; Y02E 10/76
USPC .................................. 307/126, 64–68, 80–87
See application file for complete search history.

(56) References Cited

U.S. PATENT DOCUMENTS

| | | | |
|---|---|---|---|
| 2005/0057878 A1* | 3/2005 | Serrano .................. | H01H 89/06 361/115 |
| 2006/0226706 A1 | 10/2006 | Edelen et al. | |
| 2008/0203820 A1 | 8/2008 | Kramer et al. | |
| 2010/0038966 A1* | 2/2010 | Espeut, Jr. ............... | H01H 9/26 307/68 |
| 2011/0140648 A1* | 6/2011 | Lee .......................... | H02J 3/32 320/101 |
| 2012/0267957 A1* | 10/2012 | Czarnecki ............... | H02J 9/062 307/64 |
| 2012/0299381 A1* | 11/2012 | Larson ..................... | H02J 9/06 307/60 |
| 2013/0049476 A1* | 2/2013 | Lathrop .................. | H02J 9/066 307/80 |
| 2015/0180275 A1* | 6/2015 | Tomassi .................. | H02J 9/06 307/64 |
| 2016/0197481 A1* | 7/2016 | Nishigai ................. | H02J 3/383 307/43 |

FOREIGN PATENT DOCUMENTS

| | | |
|---|---|---|
| EP | 2228895 | 9/2010 |
| EP | 2365598 | 9/2011 |
| WO | 2007/004514 | 1/2007 |
| WO | 2016/036419 A1 | 3/2016 |

OTHER PUBLICATIONS

European Search Report for EP application No. 16165380.3, dated Feb. 22, 2021, pp. 1-10.
Sace Abb: "SAGE Emax Low voltage air circuit-breakers", Jan. 31, 2013 (Jan. 31, 2013), pp. 1-276, XP055776635, Retrieved from the Internet: URL:https://search.abb.com/library/Download.aspx?.

\* cited by examiner

POWER SUPPLY ARRANGEMENT

TECHNICAL FIELD

The invention relates to a power supply arrangement comprising a power source and a switching arrangement. The switching arrangement comprises a switching block, wherein the switching block includes a source interface for connecting the power, a load interface for connecting a load and a grid interface for connecting a grid.

BACKGROUND ART

Access to electricity is of fundamental importance today. Power sources shall provide power at any times without interruption. This not only applies to large power plants supplying a region or a settlement area but also to local power source providing power for example to a premises. In the interests of ensuring an uninterrupted power supply electrical loads are often connected to more than one power source. This opens the possibility of an uninterrupted power supply to a load even in case of a failure of one power source.

That does apply in particular to power supply arrangements comprising a renewable power source. The output power of renewable power sources may vary over time and the produced output power may therefore not meet the requirements of the load at any time. Common power supply arrangements with a renewable power source usually comprise an inverter that converts a produced direct current (DC) power to single or multiphase alternating current (AC) output power. Usually a local electrical load is connected to the inverter. Such a local load may for example be represented by the power consumption of a premises. The load often is additionally connected to the public power grid. Thus, the load can be supplied with power by the renewable power source, for example by a photovoltaic (PV) system, a wind farm or a biogas plant and additionally by the grid. Furthermore the renewable power source is connected to the power grid. This offers the possibility of feeding surplus power into the grid, if the power demand of the local load is less than the power provided from the power source. In case the local demand exceeds the power provided from the renewable power source, the missing power is obtained from the public power grid. Such a grid parallel operation can have economic benefits and offers a redundant power supply to local load.

In order to optionally connect the power source to the grid or to the load or to both, the power supply arrangement comprises connection switches. Furthermore, power supply arrangements require safety precautions. If the power source continues to power the grid in case the public power grid is no longer present leads to a islanding. Such an islanding may be dangerous to power grid workers, who may not realize that a circuit is still powered. Power sources must therefore be able to detect a grid failure and then stop operating. Therefore, the power supply arrangements comprise an anti-islanding relay to disconnect the power source from the grid in case of failure of the grid or if the grid is no longer present. Switches like the connection switches and the anti-islanding relay are usually located inside the inverter on a printed wiring board (PWB).

As a further safety precaution the power supply arrangement need an additional mechanical bypass switch to disconnect the load from the power source and to connect the load to the public power grid in case of a failure of the power source. Such a bypass switch usually is arranged outside the inverter and has to be manually operated. The user has to switch the bypass switch to connect the load to the grid in case of a problem with the power source. This is not convenient and causes the risk the bypass switch being at a wrong or at a disadvantageous switching position.

There are power supply arrangements known in the art that are automatically operated in such a manner that the local power source is disconnected from the grid when the power grid fails. For example the EP 1 965 483 A1 (SMA Solar Technology AG) discloses a power supply system comprising a switching arrangement and local PV system with an inverter that is connected to the power grid, to a local load and to a battery. The power supply system disconnects the load and PV system from the grid in the case of a grid failure. The system comprises further a transfer switch between the grid and the load. The transfer switch automatically connects the load to the grid as soon as there is voltage in the grid. If there is a failure in the data connection between the switching arrangement and the PV system the transfer switch connects the load to the power grid.

Another power supply arrangement discloses the EP 2 228 895 B1 (SMA Solar Technology AG). A photovoltaic inverter comprises a relay circuit which is situated between a converter and the power grid. The relay circuit is implemented as an automatic switch for preventing an unintended feed into the grid. The inverter comprises therefore an anti-islanding detection to be able to disconnect the inverter from the grid in order to avoid dangerous situations.

The above mentioned systems automatically disconnect a local load or a local power source from the grid in case of a grid failure. But not only the grid can fail but also the local power source may have a malfunction. For example if the inverter fails the load has to be connected to the power grid to ensure a power supply. Systems known in the art do insufficiently consider that fact and have only a manual switches for example a bypass switch as descripted above for disconnecting the load from the power source. Such manually operate bypass switch bear the risk of being at a wrong or at a disadvantageous switching position. If a fault occurs in the power source or if the grid is not present and if the manually switched bypass is in a wrong position it may damage the concerned devices or it may even place persons at risk. If the bypass switch is at a disadvantageous switching position the power source may feed power into the grid and the load is supplied with power from the grid. That means the produced power may not be used for supplying the load which is disadvantageous from an economic point of view.

SUMMARY OF THE INVENTION

It is the object of the invention to create a power supply arrangement comprising a switching arrangement pertaining to the technical field initially mentioned, that allows a switching without a manual intervention and a safe power supply to a load.

Further objects of the invention are to provide a corresponding switching arrangement for the power supply arrangement and a method for controlling such a power supply arrangement.

The solution of the invention is specified by the features of claim 1. According to the invention the switching arrangement includes a controller for controlling the switching block in dependency of the condition of the power source.

The controlling of the switching block in dependency of the condition of the power source allows optionally connecting the load to the grid or to the power source or to both, i.e. to the grid and to the power source. If for example the power source fails, or if the output power of the power source does not meet the requirements of the load the controller is able to switch the switching block to connect the load to the grid. In order to obtain such a connection the controller switches the switching block such that the load interface is connected to the grid interface. Thus, the load is supplied with power despite a failure of the power source.

Due to the controlling of the switching block by the controller the switching of the switching block may be automated. The load interface may be for example automatically connected to the grid interface or to the source interface. Analogously, the load interface may be for example automatically disconnected from the grid interface or from the source interface. The switching procedure does not require a manual switching by a user. This allows providing a convenient power supply arrangement. Furthermore the risk of operating errors made by the user may be avoided. This increases the safety of the power supply arrangement.

The power supply arrangement should be understood to mean the entirety of means for supplying a load with electrical power from at least two power sources.

The power supply arrangement comprises a switching arrangement, wherein the switching arrangement includes a switching block. It is irrelevant where the switching arrangement is located. It can be arranged in a separate device or it can be integrated in an existing device such as an inverter of the power source or in a device belonging to the load or in a device belonging to the grid. The switching arrangement does not need to be one single logic unit. The switching arrangement may comprise several devices or logic units that are in any way related to the switching procedure of the power supply arrangement. Therefore, the switching arrangement does not mandatory comprise only switching devices. Instead the switching arrangement may comprise for example switches, controllers, measuring devices, monitoring devices, signals, signal lines, computing units and the like. The switching arrangement is further not limited to be in one location. The switching arrangement may comprise elements in several different physical devices. For example the inverter of the power source, a device of the load or of the power grid may comprise elements of the switching arrangement.

In the same manner the switching block must not necessarily comprise only one physical element. The switching block may comprise all elements that are adapted to switch an electrical connection. In the course of this the switching block may comprise switches, contactors, relays and also control units for controlling the status of a switch.

The term power source should be understood to mean any power generation system, which produces electrical power from non-renewable resources or from renewable resources. The power grid also supplies power but does not generate power in terms of the above definition. The power source comprises the power generating system for example a gasoline-fuelled generator, a coal-fired power station, a gas power plant, a PV system or a battery. Apart from that the power source comprises means for preparing the produced power in order to supply a load or to feed the produces power into a grid. Such means for preparing comprise for example filters for the current or voltage or filters for electromagnetic interference (EMI), power measuring devices, for example a revenue-grad meter (RGM), boosters, voltage dividers or means for power smoothing. The power source may further comprise means for temporary storing electrical energy such as a battery, a capacitor or any electrical energy storage device.

The term "condition of the power source" should be understood as the present working status of the power source. The condition of the power source may state whether the power source is operational and ready for use or whether the power source is out of order. If for example if a short circuit occurred in the power source the condition of the power source may state an error. Beside that the condition of the power source may represent the output power of the power source. If the power source is a renewable power source the output power and thus the condition of the power source may vary over time.

The switching arrangement comprises a source interface, a load interface and a grid interface. The source interface is adapted to electrically connect the power source to any receiver. That means the source interface is adapted to transmit the produced power from the power source to a device connected the source interface. For example the source interface is connected to a power line which is further connected to the load interface. Therefore, power may be transmitted from the power source to the load. In a similar manner the load interface is adapted to electrically connect the load to any power source and the grid interface is adapted to electrically connect the grid to any load or to any power source. All interfaces may be adapted to connect more than two devices, for example the source interface may be connected to a connection line leading to the load and the source interface may additionally be connected to a connection line leading to the grid. Preferably, the source interface, the load interface and the grid interface are connection boxes.

The switching arrangement further comprises a controller for controlling the switching block in dependency of the condition of the power source. The controller may be realized in a computing unit or in a computer chip. The controller may be arranged in a semi-conductor element on an integrated circuit. But the term "controller" should not be understood to mean necessarily a physical unit. Instead the controller can be a logical unit. The controller may comprise several elements that are adapted to control the switching block in dependency of condition of the power source. Furthermore the controller can be realized in an analog circuit as well as in a digital circuit. Preferably, the controller is a microcontroller. The controller can be arranged in a separate controller device such as a control box. Alternatively, it can be implemented in a device belonging to the power source, for example in the inverter.

The load should be understood to mean an electrical load that is consuming electrical power. The load may for example correspond to the entirety of the power consuming devices of a premise. Power consuming devices are for example an electrical drive, an electrical heating, a lightning or any electrical installation that consumes electrical power. The load is preferably supplied either by the power source or/and by the power grid. Preferably, the load is supplied by both, by the power source and by the grid.

Preferably, the switching arrangement is implemented as a unit separate from the power source. That offers the advantage that the switching arrangement is separated from the power source. The switching arrangement is therefore easily accessible for maintenance or if an element of the switching arrangement has to be replaced. This saves time and money during the maintenance or repair work of the switching arrangement.

Switching arrangements known in the art are usually arranged in the inverter of the power source where the user or service staff has no access or only limited access. Therefore, it may be necessary to replace the whole inverter in case of a malfunction of the switching arrangement which is inconvenient and expensive. In contrast to that a switching arrangement arranged in a unit separate from the power source is easily accessible at any time. The unit separate from the power source is exchangeable easy and quick. Furthermore, it may be easier to locate a failure in the power supply arrangement if the switching arrangement is implemented separate from the power source.

The unit separate from the power source may be realized in the type of a switching box, a wiring box, a switchboard or the like. Preferably, the unit is a wiring box. This allows accessibility to the switching arrangement independent of other devices in particular of the inverter of the power source. It is irrelevant where the unit with the switching arrangement is arranged. It may for example be arranged on a wall of a house, beside the installation of the power source, in particular near the inverter of the power source or near the grid interface.

Alternatively, the switching arrangement is implemented in the power source, for example in the inverter of the power source or in any existing box of the premises. That has the disadvantage that the switching arrangement is not easily accessible for the maintenance personnel.

Preferably, the switching arrangement comprises a monitoring device for monitoring the condition of the power source.

A monitoring device allows a focused monitoring of the power source. That allows the controller to precisely react in dependency of the condition of the power source. Therefore, the uninterrupted power supply of the load is further improved. Furthermore the monitoring with the monitoring device allows implementing a security monitoring of the power source. For example the monitoring device may be adapted that monitoring is ensured even in case of a power outage.

The monitoring device may comprise digital or analog devices. It may comprise a measuring element, a computing unit or a computer chip with several ports and a measuring device. But the monitoring device may also comprise only semi-conductor elements on an integrated circuit. In this case the monitoring device may be realized in a microcontroller. The monitoring device may further comprise more than one element and the more than one element may be arranged in several devices. The monitoring device may form a part of the controller of the switching arrangement. Alternatively, the monitoring device may be separated from the controller but arranged in a device together with the controller of the switching arrangement. In another embodiment the monitoring device may be arranged completely separate of the controller. In this case the controller of the switching arrangement and the monitoring device are arranged in two separate devices.

The monitoring device is adapted to monitor any monitorable parameter of the power source. Such parameter may for example be the power, the output current, the output voltage, the output impedance but also an electrical contact on the inverter of the power source, the operating voltage or current of the inverter, an electric or an electromagnetic field of the power source or any other suitable that allowing to determine the inverter condition.

The monitoring should be understood to mean a continuous or non-continuous and a periodical or non-periodical measurement of the condition of the power source. If the monitoring is continuously and periodically the condition of the power source is measured in regular time intervals, for example once a millisecond, once a minute or once an hour. If the monitoring is done by an analog device the monitoring may be continuously without discrete time steps. If the monitoring is done continuously and non-periodically, the monitoring device may monitor the condition of the power source for a certain time interval at an instance of an event. Such an event may be for example the start-up, the boot procedure or a change of the monitored parameter of the power source. If the monitoring is non-continuously the monitoring device may measure only one value at a specific date. A non-continuously monitoring reduces the effort of the monitoring.

Alternatively, the switching arrangement does not comprise a monitoring device. In that case the controlling of the controller is based on a user input or on a predetermined setting. But such an arrangement slows down the switching procedure and bears the risk of an erroneous switching.

Preferably, the switching block includes an automatically switchable protection switch for optionally connecting the load interface to the grid interface. That allows a safe and optional connection of the load interface to the grid interface.

The term "protection switch" is not limited to one switch. The protection switch may comprise several switches. In case of a three phase system each phase may comprise a switch for optionally connecting the respective phase from the load interface to the grid interface. A switch may be any device or circuit that is suitable to optionally connect an electric connection line. A switch may be for example a conventional switch, a latch switch, a contactor, a relay or a switching function on a PWB. Preferably, the protection switch comprises a switch for each phase of the power supply arrangement. That allows a fast and safe switching of the switching block.

In a further variant the protection switch is manually switchable by the user. Alternatively, the switching block does not comprise a protection switch. Then, the connection from the load to the grid may be non-switchable. That does not allow to optionally disconnect the load from the grid which is disadvantageous in case of a failure of the grid. In this case the load may be supplied for example by an inappropriate voltage or current from the grid.

Preferably, the controller is adapted to control the protection switch in dependency of the condition of the power source. That offers the possibility to optionally connect the load interface to the grid interface according to the condition of the power source. Preferably, the controller switches the protection switch to connect the load to the grid, if the power source is in an error condition or if the power source does not meet a specific requirement of the load.

The controller may directly control the protection switch. Alternatively, the controller may indirectly control the protection switch via an intermediate switch. This allows a safe switching of the protection switch. Controlling the protection switch means not only the controller switches the protection switch but also controls the switching status of the protection switch. This is to ensure the protection switch is in the desired switching position. The controlling of the protection switch may comprise further conditions. For example the controller may also consider the status of the grid for determining the switching status of the protection switch.

Alternatively, the protection switch is controlled independently of the condition of the power source. In that case the controller may for example switch the protection switch according to a predefined procedure. In this case the switching arrangement will not be able to correctly switch in case of unforeseen events.

Preferably, the switching block includes a control circuit for switching the protection switch. That allows safely switching the protection switch even in case of a failure of the power source or of the grid or both. The control circuit may comprise several elements adapted to control the switching of the protection switch. Therefore, the control circuit may comprise switches, relays, connection lines but also computing units, sensors and measuring devices.

Advantageously, the control switch ensures supplying the load by a power source even if one power source is out of order. That allows a safe power supply to the load. Preferably, the control switch is a control relay, which in normal condition is held open by the controller and it is closed in error condition of the power source. Alternatively, the control relay is held closed in normal condition by the controller and it is held open in error condition of the power source. In a preferred embodiment the controller controls the control relay such that the control relay switches the protection switch if the controller is in an error condition and if the grid is present. Preferably, the control relay connects in its closed condition the load interface to the grid interface. This increases the safety of the power supply of the load.

Alternatively, the switching block does not include a control circuit. The protection switch may then be switched only by the controller or it may be manually switched by the user. This increases the risk of an erroneous switching of the protection switch and thus the load may be connected to the wrong power source.

Preferably, the protection switch is a contactor. The contactor preferably has two switching states. Advantageously, each phase of the power supply arrangement has its own contactor. The contactor offers a high current load rating and it allows a high inrush current compared with a conventional relay switch. Therefore, the switching block has a high robustness. Alternatively, the protection switch is a relay switch or a switching function in a switching circuit on a PWB or any other suitable switch for safely connecting and/or disconnecting the load to or from the grid.

In a preferred embodiment the power supply arrangement includes a source switch for optionally connecting the source interface to the load interface and an anti-islanding circuit for optionally connection the source interface to the grid interface. This allows for example to temporary disconnect the power source from the load or from the grid. This may be necessary to supply the load only with a specific power or to meet specific power grid requirements. Particularly, this applies if the power source is a renewable power source having non-constant output power. But the source switch and the anti-islanding circuit may also be needed in case of a failure of the grid in order to disconnect the power source the grid.

The term "source switch" is not limited to a single element. The source switch may comprise several switches and devices directly related to the switches. It is irrelevant what kind of switch the source switch is. It may comprise for example a conventional electrical switch, a relay switch, a contactor or just a switching function on any electrical circuit. Analogously the anti-islanding circuit may comprise any kind of switches.

Furthermore the source switch and the anti-islanding circuit do not mandatory have to be arranged in an element of the power source. They may be arranged in a separate device or in the switching block. Preferably, the switching arrangement comprises the source switch and the anti-islanding circuit.

Alternatively, the source interface is permanently connected to the load interface or to the grid interface or to both, to the source interface and the load interface. This has the disadvantage that the load may not be disconnected in case of a failure of the grid or of the load. This may lead to a dangerous islanding operation.

Preferably, the load comprises power consuming devices of a premises. Preferably, the load comprises the entirety of the power consuming devices of the premises.

The premises may include for example a building, a factory, an estate or a property as well as a store or the like. Preferably, the premises are a building including all its electrical installations like for example an electrical heating, the light installation or all other electrical loads of a building. In case of residential premises, the load is constituted for example by an electrical heating, the electric light installation, kitchen appliances, washing machine, dryer, fridge, freezer, iron, radio, television or the like. "The power consuming devices" means all devices that consume power at a particular moment. Therefore the load may correspond to a single device or to several power consuming devices. For example if in a household only the washing machine is consuming power then only the washing machine corresponds to the load. The load may therefore also rapidly change over time if for example a cooktop is switched at the same time as the fume cupboard and the oven.

Alternatively the load may for example include a machine, a drive, or a light installation.

In a preferred embodiment the power source is a renewable power source, preferably a photovoltaic power source.

A renewable power source means a power source that produces renewable energy. Renewable power sources may comprise for example a photovoltaic system, a wind farm, a hydroelectric power station, a geothermal power station, a biogas plant, a tidal power station, heat pumps or a combination of two or more of these power sources. Renewable energy has the advantage that the energy comes from resources which are naturally replenished. Renewable energy resources exist over wide geographical areas in contrast to non-renewable energy sources, which are concentrated in a limited number of countries.

Alternatively, the power source may comprise non-renewable energy such as fossil fuels or nuclear fuels. The power source in this case may for example comprise nuclear power plant, a coal-fired power station, a gas power plant, a gasoline-fuelled generator or a combination of these power sources.

Preferably, the power supply arrangement is adapted for a three phase system. Preferably the power source comprises an inverter for converting the generated DC power to a three phase alternating current (AC). As a three-phase power grid is standard the three-phase AC power is feedable in the gird.

Alternatively, the multiphase AC output power may comprise only two phases or four or more phases.

The solution of the invention regarding the switching arrangement is specified by the features as above mentioned.

The solution of the invention regarding the method is specified by the features of claim 13. The method for controlling a power supply arrangement for connecting a load to a power source and/or to a power grid, in particular a power supply arrangement according to any of claims 1 to 11 is characterized by the steps of:

a. optionally connecting the load to the power source,
b. monitoring a condition of the power source
a. optionally connecting the load to the power grid in dependency of the condition of the power source.

Preferably, the method includes connecting the load to the power grid if the power source is in an error condition.

Alternatively, the controller connects the load interface to the grid interface by switching the protection switch in case of a user input or according to a predetermined switching procedure.

Preferably, the step of optionally connecting the load to the power grid in dependency of the condition of the power source includes controlling a protection switch by controlling a control relay.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
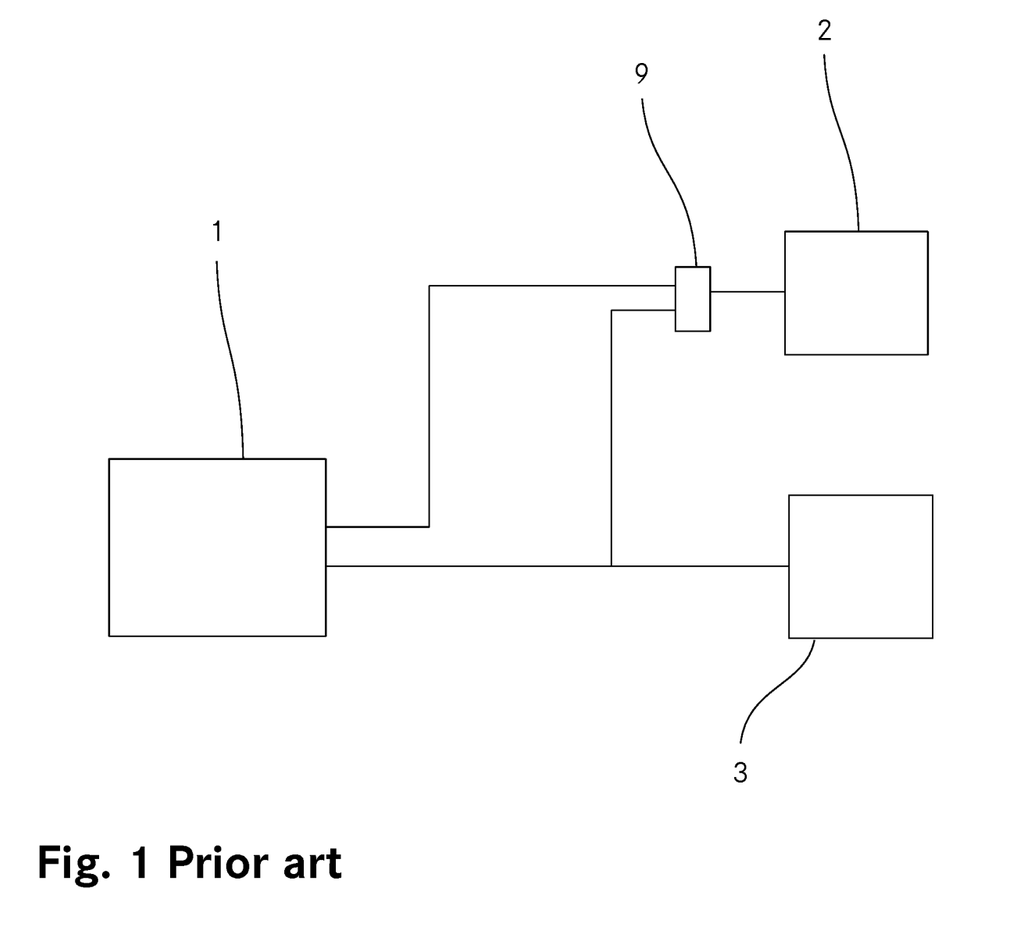
FIG. 1 a schematic circuit diagram of a state of the art power supply arrangement including a PV system, a local load, a public power grid and a wiring box connecting the PV system, the load and the grid to each other.

FIG. 1 shows a schematic circuit diagram of a power supply arrangement used for a domestic installation as it is known in the art. The power supply arrangement comprises a PV system 1 as a power source, an electrical load 2, a public power grid 3, and a mechanical bypass switch 9 having two switching states. In the first switching state of the bypass switch 9 the load 2 is connected to the PV system 1 and in the second switching state the load 2 is connected to the grid 3. The PV system 1 is optionally connected to the load 2 or to the grid 3 or to both, to the load 2 and to the grid 3.

Figure 2:
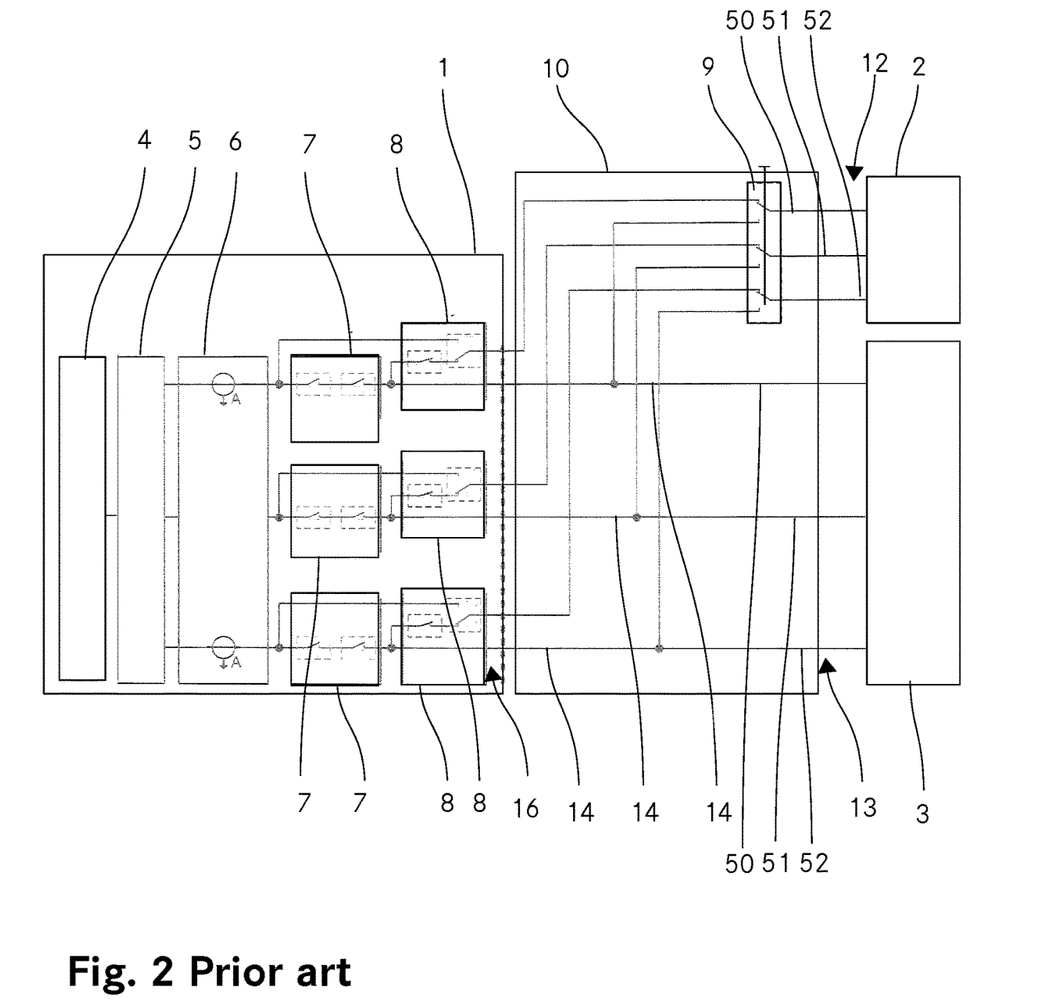
FIG. 2 a more detailed schematic circuit diagram of a state of the art power supply arrangement.

FIG. 2 shows a more detailed schematic circuit diagram of a power supply arrangement known in the art. As shown in FIG. 2 the power supply arrangement comprises a source interface 16 for connecting the PV system 1, a load interface 12 for connecting the load 2, a grid interface 13 for connecting the grid 3. The load 2 is connected through its load interface 12 to the source interface 16 of the PV system 1. The load 2 is further connected through its load interface 12 to the grid interface 13 of the grid 3. Additionally the PV system 1 is connected through its source interface 16 to the grid interface 13 of the grid 3. The grid 3 is preferably a common public power grid. The wiring box 10 comprises the wires required for the connections and it comprises further the mechanical bypass switch 9. The power supply arrangement as shown in FIG. 2 is a two-phase system with a phase one 50, a phase two 51 and a neutral conductor 52.

The PV system 1 comprises a power producing part 4, an inverter 5, a Revenue Grade Meter (RGM) 6 as an output measuring device, an anti-islanding circuit 7 and an output circuit 8. The PV system 1 may further comprise an energy storage device such as a battery (not shown). The power producing part 4 represents the solar modules of the PV system 1. The inverter 5 is connected to the modules and converts the produced direct current (DC) to an alternating current (AC) output power. The RGM 6 is connected to two phases of the output of the inverter 5 and measures the produced power. After the RGM 6 the anti-islanding circuit 7 is installed. The anti-islanding circuit 7 comprises two serially arranged switches, ensuring that the PV system 1 does not feed power into the grid 3 if the grid 3 is not present. In the case the grid 3 is not present the anti-islanding circuit 7 disconnects the PV system 1 from the grid 3 for safety concerns. Each phase comprises an anti-islanding circuit 7.

The PV system comprises further the output circuit 8, which includes a latch switch and a single pole changeover switch (SPCO) for each phase. The latch switch is arranged in a branch branching after the switches of the anti-islanding circuit 7 in a direction seen from the power producing part 4 to the output of the PV system 1. The SPCO switch comprises two inputs. One input is connected to the output of the latch switch. The other input of the SPCO switch is connected to the output of the RGM 6. The output of the SPCO switch is connected to source interface 16. Therefore the SPCO switch may either connect the output of the latch switch to the source interface 16 or it may directly connect the output of the RGM 6 to the source interface 16. Hence, the output circuit 8 is adapted to optionally connect the PV system 1 to the load 2. But the switchable connections of the output circuit 8 depend on the switching position of the bypass switch 9 as descripted below. The connections of the PV system 1 to the load 2 and to the grid 3 are realized by the source interface 16 and the load interface 12 and the grid interface 13, respectively. Hence, one branch of the power line per phase leads form the source interface 16 to the wiring box 10 and further to the bypass switch 9. The other branch leads from the source interface 16 to the grid interface 13.

The anti-islanding circuit 7 and the output circuit 8 are physically arranged in a circuit in the inverter 5 of the PV system 1. The output circuit 8 is usually realized as a PWB relay.

Preferably, the load 2 corresponds to the entirety of power consuming devices of a building or premises that actually is consuming power at a particular time. Hence, the load may correspond for example to a heat pump, water heaters, an electric stove, a refrigerator, a freezer, lighting, a dishwasher, a washing machine, a television and all other electric or electronic devices used in a household.

As mentioned above the wiring box 10 comprises the mechanical bypass switch 9. The bypass switch 9 is on one hand connected to the load 2 through the load interface 12 and on the other hand to the PV system 1 through the source interface 16 and to the grid 3 through the grid interface 13. The bypass switch 9 is manually switchable and has two switching position; an inverter position, which connects the load 2 to the PV system 1 and a grid position, which connects the load 2 to the grid 3.

As the PV system is optionally connectable to the grid 3 or/and to the load 2 the produced power can be provided to the load 2 as well as to the grid 3. Depending on the quantity of the produced power the power can only be provided to the load 2 or the entire output power can be fed into the power grid 3. As another option the produced power may be divided. That means a partial quantity of the output power is provided to the load 2 and another partial is provided to the power grid 3. On the other hand if the power demand of the load 2 exceeds the available power 2 of the PV system 1 additional power can be obtained from the power grid 3. If the PV system 1 does not produce any power at all due to lack of sunlight or due to a failure all power provided to the load 2 is obtained from grid 3. The RGM 6 measures the quantity of the power produced by the solar modules and that is provided at the output of the PV system 1.

The bypass switch 9 may be switched according to the operation mode or the availability of the power of the grid 3 or of the PV system 1. If for example the grid 3 is not present the user may manually switch the bypass switch 9 at the inverter position in order to connect the load 2 to the PV system 1. Depending on the switching status of the anti-islanding circuit 7 and the output circuit 8 the load 2 is either completely disconnected from the grid 3 and only connected to the PV system 1 or the load 2 is connected to both, the PV system 1 and to the grid 3.

In the case the PV system 1 has a failure or the provided power is inappropriate to supply the load 2 the user may switch the bypass switch 9 at the grid position in order to directly connect the load 2 to the grid 3. Depending on the switching status of the anti-islanding circuit 7 and the output circuit 8 the load 2 is either completely disconnected from the PV system 1 and only connected to the grid 3 or the load 2 is connected to both, the PV system 2 and to the grid 3.

Figure 3:
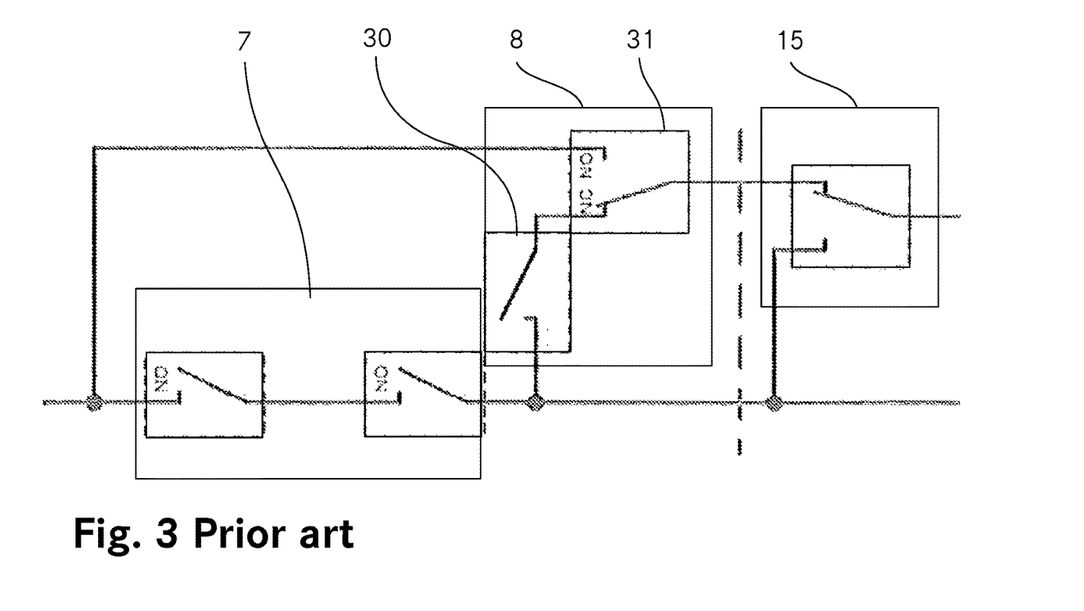
FIG. 3 a schematic circuit diagram of a state of the art anti-islanding circuit, output circuit and a bypass switch, wherein the bypass switch is at an inverter position.
Figure 4:
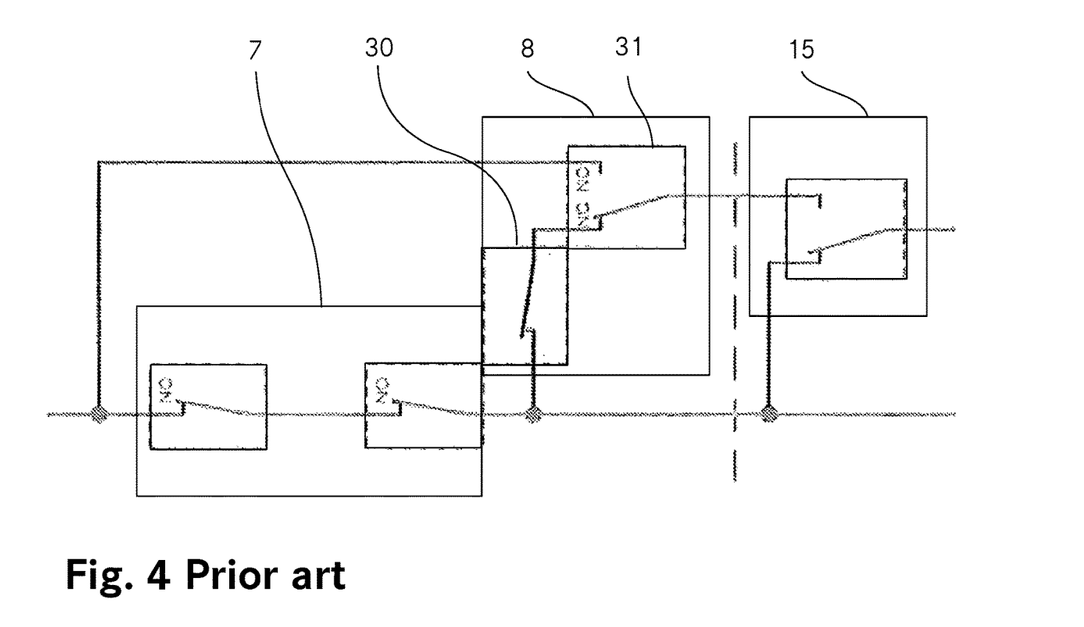
FIG. 4 a schematic circuit diagram of a state of the art anti-islanding circuit, output circuit and a bypass switch, wherein the bypass switch is at a grid position.

FIG. 3 and FIG. 4 show a detailed view of a possible circuit of the anti-islanding circuit 7 the output circuit 8 and the bypass switch 9 as it is known in the art. For reasons of simplicity only the switches of one phase are shown. As shown in FIGS. 3 and 4 the output circuit 8 comprises the SPCO switch 31 and the latch switch 30.

If the bypass switch 15 is at the inverter position as shown in FIG. 3 and if the switches of the anti-islanding circuit 7 are closed the output circuit 8 may be switched such that the load 2 is only connected to the PV system for the load 2 is only connected to the grid 3 or the load is connected to both, to the PV system 1 and to the grid 3. If the bypass switch 9 is still in the inverter position but the switches of the anti-islanding circuit 7 are open the output circuit 8 may be switched such that the load 2 is only connected to the PV system 1 or only connected to the grid 3 or the load 2 is disconnected from both, from the PV system 1 and from the grid 3. If the bypass switch 9 is at a grid position as shown in FIG. 4, the load 2 is in any case connected to the grid 2 independent of the switching status of the anti-islanding circuit 7 and the output circuit 8.

The bypass switch 9 being at the inverter position has the disadvantage that a switching state could occur in that the load 2 is not supplied by a power source. This would be the case if the grid 3 is at the moment not present and the PV system 1 is not working and if the switches of the anti-islanding circuit 7 are open and the latch switch 30 of the output circuit 8 is open too and furthermore the SPCO switch 31 of the output circuit 8 is in its normally closed position (n.c) as shown in FIG. 3. When the grid 3 is present again the manually operated bypass switch 9 stays in the inverter position and the load 2 is not connected and hence not supplied with power by the grid 3.

FIG. 4 shows another disadvantageous switching state. This state occurs if the PV system 1 is producing power and the grid 3 is present and the bypass switch 9 is at the grid position, the switches of the anti-islanding circuit 7 are closed, the latch 30 is closed too and if the SPCO switch 31 is in its normally closed (n.c.) position. In this case the load 2 is supplied by the grid 3 although the PV system 1 is producing power and feeding power into the grid 3. This may be unintentional because it may be more economical to supply the load 2 with the power produced by the PV system 1.

Figure 5:
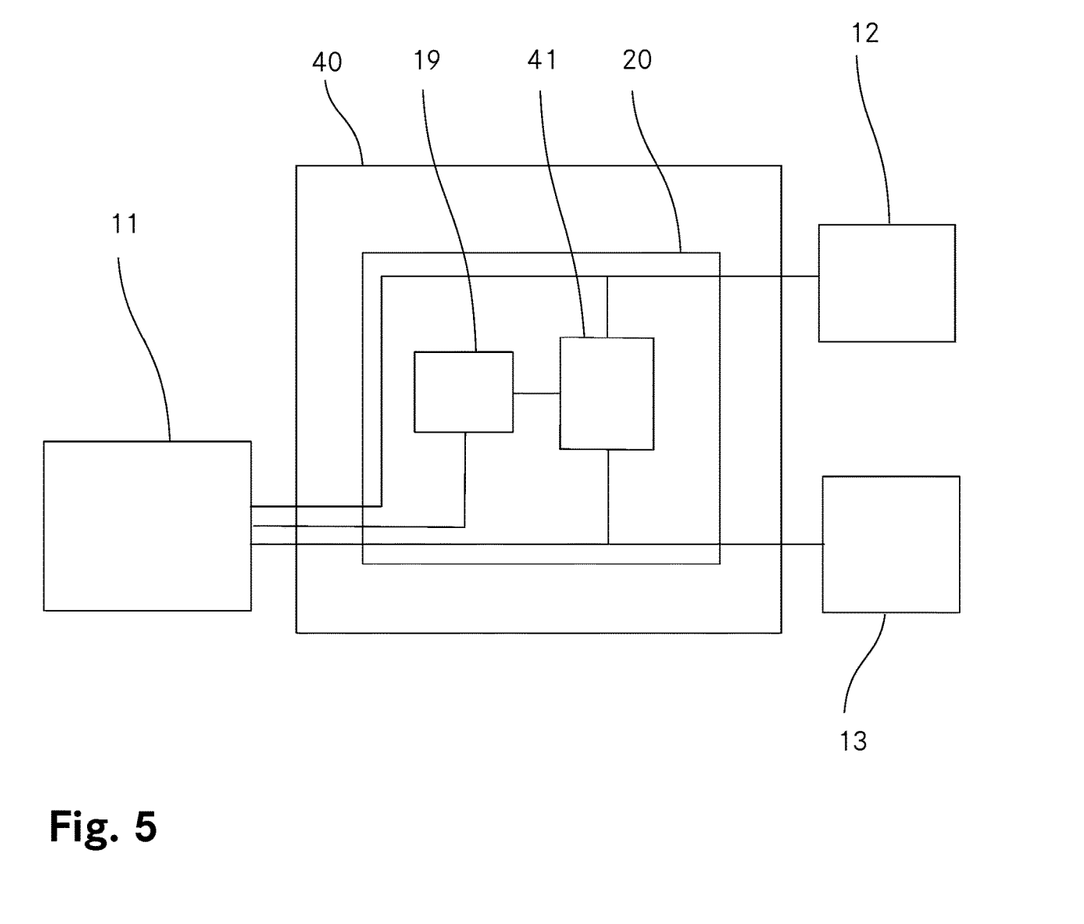
FIG. 5 a schematic circuit diagram of a power supply arrangement according to the invention including a PV system, a local load, a public power grid, a controller and a wiring box.

FIG. 5 shows a schematic circuit diagram of a power supply arrangement used for domestic installations according to the invention. The system is similar to the system shown in FIG. 1 but the system according to the invention comprises further a switching arrangement 40 including a controller 19 and a switching block 41. The controller 19 is adapted to control the switching block 41 in dependency of the condition of the PV system 11. In contrast to the state of the art the load 12 and the PV system 11 are connected to each other without a bypass switch in the connection line. Instead the switching block 41 is arranged between the load 12 and the grid 13. Preferably, the controller 19 and the switching block form a wiring box 20 connecting the PV system 11, the grid 13 and the load 12.

Figure 6:
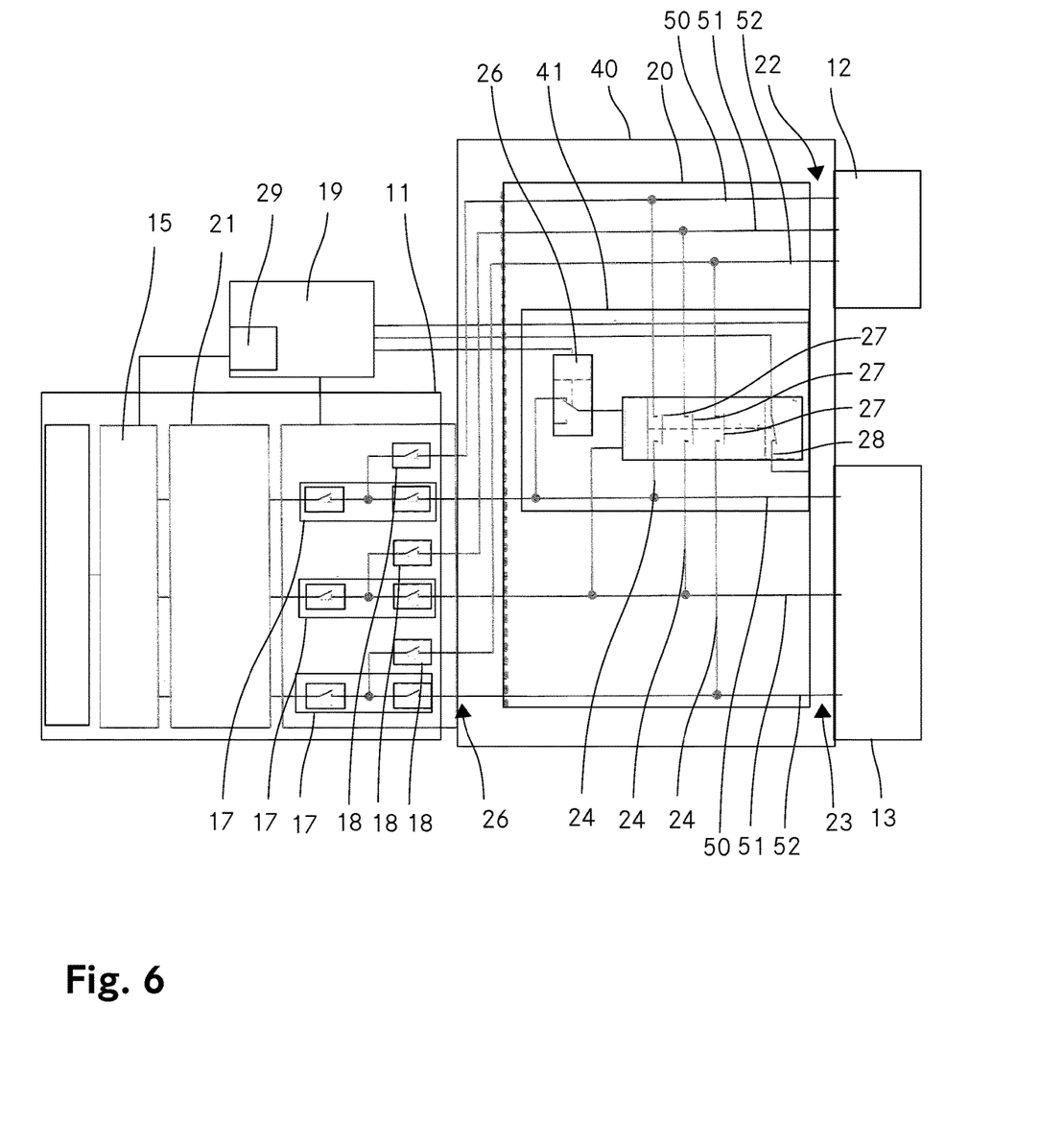
FIG. 6 a more detailed schematic circuit diagram of a power supply arrangement according to the invention.

FIG. 6 shows a more detailed possible embodiment of the power supply arrangement according to the invention shown in FIG. 5. As shown in FIG. 6 the switching block 41 includes three contactors 27 one for each power line working as protection switches and a control circuit represented by a control relay 26. The term power line shall be deemed to mean all electrical connections, for example a cable or a connection on a PWB. The control relay 26 is connected to one phase of the grid 13 and further connected to a coil of the three contactors 27. Additionally the coil of the contactors 27 may be connected between the phases of the grid 13. Preferably, the coil is connected to one phase of the grid 13 and to the control relay 26. The controller 19 comprises a monitoring device 29 and communicates with the inverter 15 of the PV system 11. Furthermore, the controller 19 is connected to the control relay 26 and to a contactor switch 28 which in turn is connected to the contactors 27. The power supply arrangement as shown in FIG. 6 is a two-phase system with a phase one 50, a phase two 51 and a neutral conductor 52.

The PV system 11 comprises for each power line (the two phases and the neutral conductor) an anti-islanding circuit 17 and an output circuit 18 which represents a source switch. The controller 19 is connected to the inverter 15 and to the switches of the anti-islanding circuit 17 and the output circuit 18. The anti-islanding circuit 17 includes two serially connected switches. In contrast to the prior art PV system shown in FIG. 1 the output circuit 18 of the PV system 11 comprises only one switch. That switch is arranged in a branch which branches from the line between the two serially arranged switches of the anti-islanding circuit 17. Physically the anti-islanding circuit 17 and the output circuit 18 preferably are arranged in the inverter 15 of the PV system 11.

As mentioned above the power supply arrangement according to the invention does not comprise a bypass switch. Instead the controller 19 and the switching block 41 with the control relay 26 and the contactors 27 replace the manually operated mechanical bypass switch. That means the function of optionally connecting the load 12 to the grid 13 is automated by the controller 19, the switching block 41 and the monitoring device 29. The contactors 27 are controlled by the controller 19 via control relay 26, which is preferably a form C relay. The contactors 27 allow optionally connecting the load 12 to the grid 13 by closing the connection lines 24 connecting the load interface 22 with the grid interface 23.

In a normal condition the controller 19 controls the contactors 27 by switching the control relay 26. The control relay 26 comprises two switching states, an open position and a closed grid position. If the control relay 26 is held open in its open position by the controller 19 the contactors 27 are in an open position too because the control relay 26 is connected to the three contactors 27. If the controller 19 closes the control relay 26 and if the grid 13 is present the contactors 27 are closed too. The controller 19 is able to monitor the switching state of the contactors 27 by the contactor switch 28 because the contactor switch 28 is connected to the contactors 27 as well as to the controller 19. The controller 19 may switch the contactors 27 depending on the operating mode or depending on the status of the PV system 11. Depending on the quantity of the produced power of the PV system 11 the controller 19 may optionally connect the load 12 via contactor 27 to the grid 13 or in the other case the controller 19 may disconnect the load 12 from the grid 13 enabling an off-grid operation of the power supply system.

Beside the normal condition there exists an error condition. Such a condition may occur in case of any fault of the PV system 11 for example if the inverter circuit fails, if the Revenue Grad Meter 21 does not correctly measure the output power or if the inverter 15 fails converting the produced power. The monitoring device 29 of the controller 19 monitors the condition of the PV system 11 by monitoring the inverter 15. If any error occurs the controller 19 receives this information through the monitoring device 29 and releases the control relay 26. Hence, the control relay 26 changes to its grid position that is the default condition of the control relay 26. If the control relay 26 is in the grid position and if the grid 13 is present the control relay 26 closes the contactors 27. The closing of the contactors 27 connects the load interface 22 to the grid interface 23. Hence, in the case of any fault of the PV system 11 recognized by the controller 19 the load 12 is automatically connected to the grid 13. This allows a safe and an uninterrupted power supply of the load 12.

FIGS. 7a-7d show detailed views of the switches of the anti-islanding circuit 17, the output circuit 18 and the contactor 27 according to the invention. For reasons of simplicity only the switches of one phase are shown in FIG. 7a-7d.

Figure 7A:
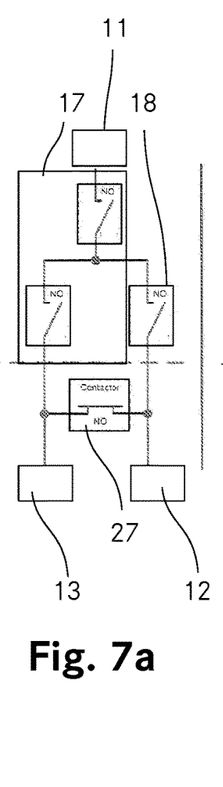
FIG. 7*a*-7*d* a detailed schematic circuit diagram of the anti-islanding circuit, the output circuit and the contactor according to the invention.

FIG. 7a shows the case if the grid 13 is present and the PV system 11 fails or does not produce power. The switches of the anti-islanding circuit 17 are open and the switch of the output circuit 18 is open as well. The contactor 27 is closed. The load 12 is therefore only connected via contactor 27 to the grid 13.

Figure 7B:
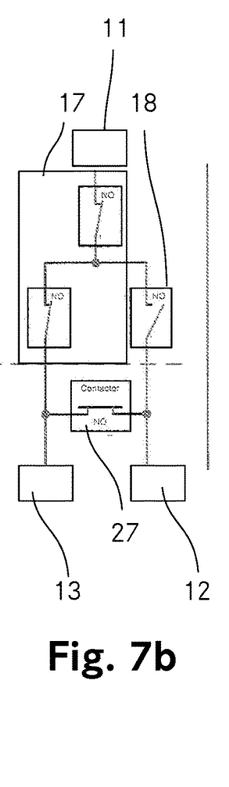

FIG. 7b shows the switching state if the grid 13 is present and the PV system 11 is feeding power into the grid 13. The switch of the output circuit 18 is open. This represents the normal grid operation.

Figure 7C:
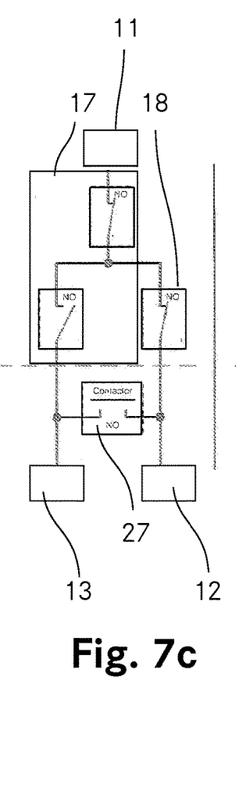

FIG. 7c shows the switching state if the grid 13 is not present. The contactor 27 and one of the switches of the anti-islanding circuit 17 are open and the switch of the output circuit 18 is closed. The load 12 is therefore only connected to the PV system 11 but not to the grid 13. This represents the normal off-grid operation.

Figure 7D:
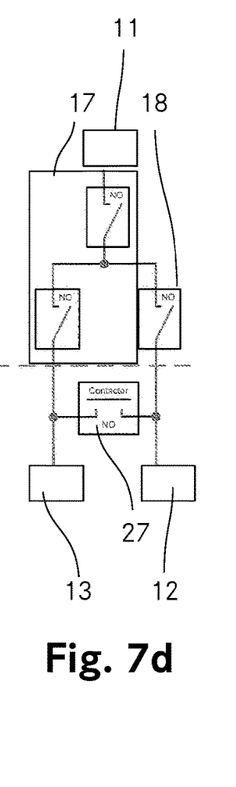

FIG. 7d shows the switching state if neither the grid 13 is present nor the PV system 11 is producing power. All switches of the anti-islanding circuit 17 and of the output circuit 18 are open. Hence, the load 12 is neither connected to the PV system 11 nor to the grid 13.

With the automated switching of the contactors 27 the above mentioned disadvantageous switching states can not occur. If the PV system 11 is not producing power and if the grid 13 is not present the contactor 27 is open but the contactor 27 is automatically closed as soon as the grid 13 is present again because the control relay 26 changes to its grid position as soon as there is a voltage across the phases of the grid 3.

If the contactors 27 are open and the load 12 is therefore not connected to the grid 13 the PV system 11 may be connected at any time to the grid 13. This allows meeting the requirements of the rule regarding the fault ride through (FRT). The rule states that the power source has to stay connected to the grid 13 in short periods of lower grid voltage in order to avoid a short circuit on the grid 13.

FIGS. 5 to 7 show possible arrangements of the power supply arrangement according to the invention. But also other embodiments are possible. For example the anti-islanding circuit 17 and the output circuit 18 do not have to be arranged in the inverter 15. Instead they may be arranged in the switching block 41 or in a separate device. The controller 19 may be arranged in the wiring box 20 or it may also be arranged outside the wiring box in a separate device. In another example, a controller of the inverter may additionally assume the control functions of the controller 19. The monitoring device 29 is in direct communication with the controller 19. But the monitoring device 29 does not have to be mandatory arranged inside the controller 19 or forming a part of the controller 19. Instead the monitoring device 29 may be arranged in the switching block 41, in the inverter 15 or in a separate device. In cases, where the inverter 15 already includes a device that monitors its condition, such a device may also be used as the monitoring device 29.

In summary, it is to be noted that a power supply arrangement is provided that allows an uninterrupted supply to a load in case of a failure of the power source.

The invention claimed is:

1. A power supply arrangement comprising a power source and a switching arrangement, the switching arrangement including a switching block, wherein the switching block includes a source interface for connecting the power source, a load interface for connecting a load, a grid interface for connecting a grid, and elements adapted to switch an electrical connection, wherein the switching arrangement includes a controller having a switching block interface connected to the switching block for controlling switching elements of the switching block in dependency of the condition of the power source and wherein the switching arrangement is implemented as a device separate from the power source, wherein the switching arrangement comprises a single monitoring device configured for monitoring power condition, wherein the monitoring device has only a single monitoring interface, wherein the single monitoring interface is connected only to the power source in order to receive a monitored condition of the power source and wherein the monitoring device further includes a controller interface for conveying only the monitored condition of the power source to the controller.

2. The power supply arrangement according to claim 1, wherein the switching block includes an automatically switchable protection switch for connecting the load interface to the grid interface.

3. The power supply arrangement according to claim 2, wherein the controller is adapted to control the protection switch in dependency of the condition of the power source.

4. The power supply arrangement according to claim 3, includes a control circuit for switching the protection switch.

5. The power supply arrangement according to claim 3, wherein the protection switch is a contactor.

6. The power supply arrangement according to claim 1, including a source switch for connecting the source interface to the load interface and an anti-islanding circuit for connecting the source interface to the grid interface.

7. The power supply arrangement according to claim 1, wherein the load comprises power consuming devices of a premises.

8. The power supply arrangement according to claim 1, wherein the power source is a renewable power source.

9. The power supply arrangement according to claim 8, wherein the renewable power source is a photovoltaic power source.

10. The power supply arrangement according to claim 1, adapted for a three phase system.

11. A method for controlling a power supply arrangement for connecting a load to a power source and/or to a power grid, in particular a power supply arrangement according to claim 1, said method comprising the steps of:
  a. connecting the load to the power source,
  b. monitoring a condition of the power source
  c. connecting the load to the power grid in dependency of the condition of the power source.

12. Method according to claim 11, including connecting the load to the power grid if the power source is in an error condition.

13. Method according to claim 12, wherein the step of connecting the load to the power grid in dependency of the condition of the power source includes controlling a protection switch by controlling a control relay.

* * * * *